(12) United States Patent
Oba et al.

(10) Patent No.: US 8,270,948 B2
(45) Date of Patent: Sep. 18, 2012

(54) SOLVING PANA BOOTSTRAPPING TIMING PROBLEM

(75) Inventors: Yoshihiro Oba, Englewood Cliffs, NJ (US); Rafael Marin Lopez, Murcia (ES)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 854 days.

(21) Appl. No.: 11/624,586

(22) Filed: Jan. 18, 2007

(65) Prior Publication Data
US 2008/0175208 A1    Jul. 24, 2008

(51) Int. Cl.
*H04M 1/66* (2006.01)
*H04L 9/32* (2006.01)
(52) U.S. Cl. ........................ 455/411; 713/168
(58) Field of Classification Search .................... 455/411
See application file for complete search history.

(56) References Cited

U.S. PATENT DOCUMENTS

| | | | |
|---|---|---|---|
| 2004/0148504 A1* | 7/2004 | Forsberg | 713/168 |
| 2005/0078824 A1* | 4/2005 | Malinen et al. | 380/247 |
| 2006/0002557 A1 | 1/2006 | Madour et al. | |
| 2006/0036733 A1 | 2/2006 | Fujimoto et al. | |
| 2006/0185013 A1 | 8/2006 | Oyama et al. | |

OTHER PUBLICATIONS

International Preliminary Report, Jul. 30, 2009, pp. 1-6.
International Search Report dated May 28, 2008.
Canadian Office Action dated Feb. 29, 2012, issued in corresponding Canadian Patent Application No. 2,675,837; (2 pages).

\* cited by examiner

*Primary Examiner* — Lester Kincaid
*Assistant Examiner* — Joel Ajayi
(74) *Attorney, Agent, or Firm* — Westerman, Hattori, Daniels & Adrian, LLP

(57) ABSTRACT

A method for avoiding loss of data or consumption of resources between a mobile node and an new access network in which an authentication agent performs authentication with an authentication client of the mobile node to effect access to an enforcement point of said access network, said method comprising informing an authentication client of said mobile node that an authentication agent has completed an installation process with the enforcement point.

17 Claims, 8 Drawing Sheets

FIG. 1

```
PaC    PAA    Message

// Handshake phase
  ------>     PANA-Client-Initiation
  <------     PANA-Start-Request
  ------>     PANA-Start-Answer // Authentication and authorization phase
  <------     PANA-Auth-Request  /* EAP Request */
  ------>     PANA-Auth-Answer
  <------     PANA-Auth-Request  /* EAP Response */
  ------>     PANA-Auth-Answer
  <------     PANA-Bind-Request  /* EAP Success */
  ------>     PANA-Bind-Answer // Access phase (IP data traffic allowed)
  <------     PANA-Ping-Request
  ------>     PANA-Ping-Answer // Termination phase
  ------>     PANA-Termination-Request
  <------     PANA-Termination-Answer
```

Figure 1: Illustration of PANA messages in a session

Note that depending on the environment and deployment the protocol flow depicted in Figure 1 can be abbreviated (An unsolicited PANA-Start-Request message can be sent without PANA-Client-Initiation, EAP responses can be piggybacked on the PANA-Auth-Answers, and PANA-Ping and PANA-Termination usage is optional).

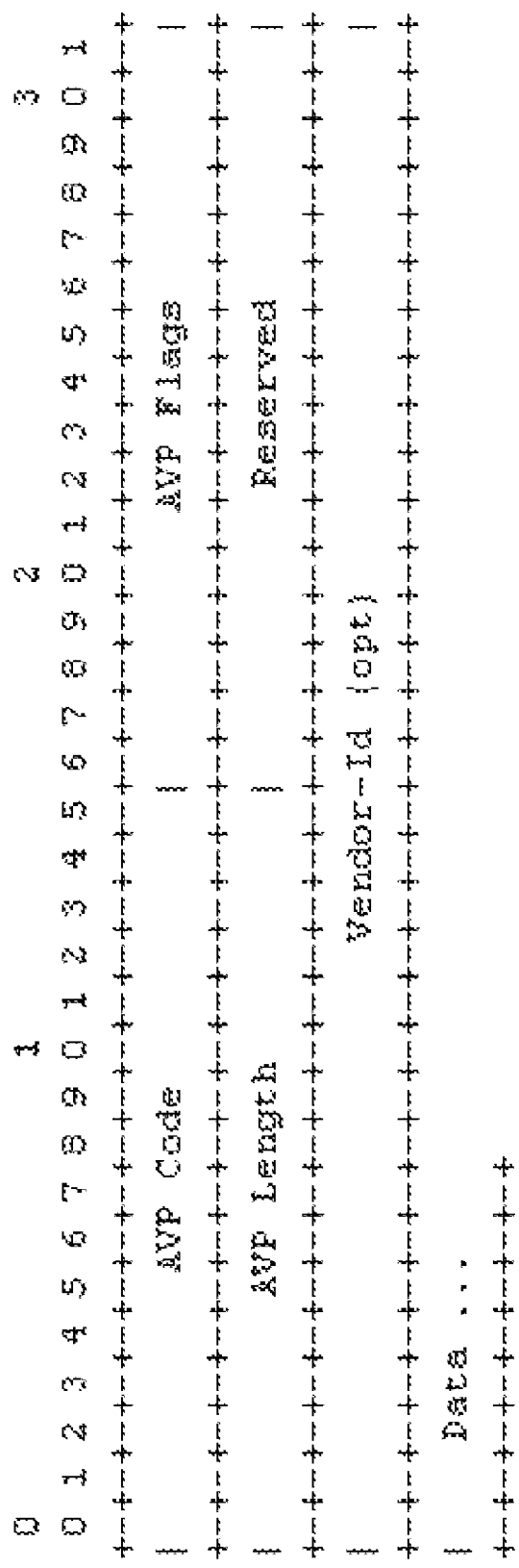
FIG. 2: AVP HEADER FORMAT

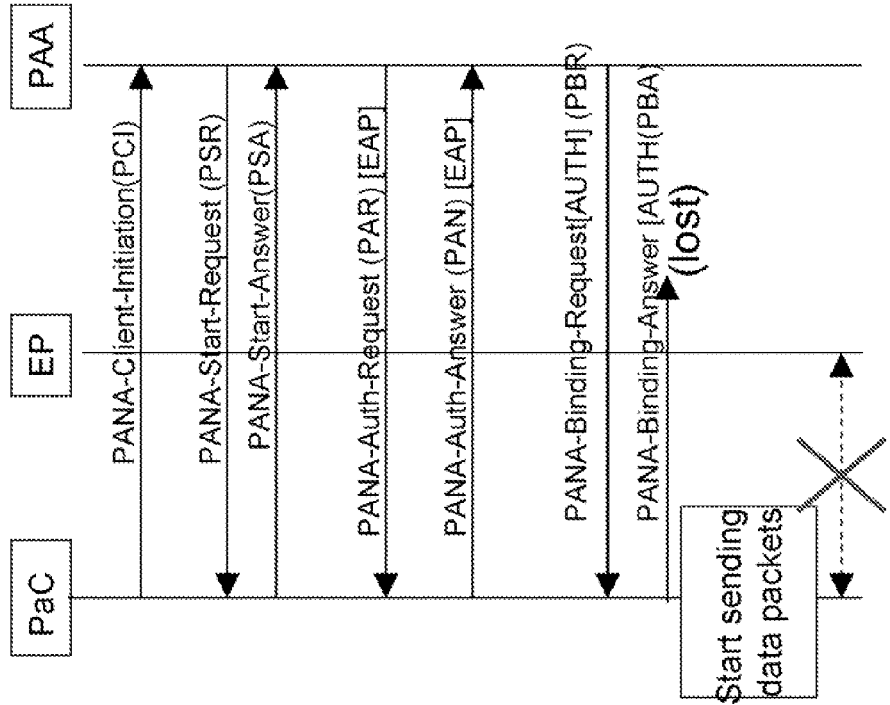

(Example 1: PANA over 802.11i)

FIG. 5(A)

```
PANA-Conf-Request::=< PANA-Header: 11,
REQ >
                < Session-Id >
                { Result-Code }
                [ Notification ]
              * [ AVP ]
            0*1 < AUTH >
```

FIG. 5(B)

```
PANA-Conf-Answer::=< PANA-Header:
                    11>
                < Session-Id >
                [ Notification ]
              * [ AVP ]
            0*1 < AUTH >
```

FIG. 6(A)

```
PANA-Bind-Request ::= < PANA-Header: 5, REQ, [CONF] >
                      < Session-Id >
                      { Result-Code }
                      [ PPAC ]
                      [ EAP-Payload ]
                      [ Session-Lifetime ]
                      [ Protection-Capability ]
                      [ Key-Id ]
                    * [ Algorithm ]
                      [ Device-Id ]
                      [ Notification ]
                    * [ AVP ]
                  0*1 < AUTH >
```

FIG. 6(B)

```
PANA-Bind-Request ::= < PANA-Header: 5, REQ >
                      < Session-Id >
                      { Result-Code }
                      [ PPAC ]
                      [ EAP-Payload ]
                      [ Session-Lifetime ]
                      [ Protection-Capability ]
                      [ Key-Id ]
                      [ Algorithm ]
                      [ Device-Id ]
                    * [ Notification ]
                      [ Delayed-Authz ]
                    * [ AVP ]
                  0*1 < AUTH >
```

SOLVING PANA BOOTSTRAPPING TIMING PROBLEM

BACKGROUND

1. Field of the Invention

The present application relates to wireless networking and, in some preferred embodiments, to systems and methods for solving authentication (e.g., PANA) bootstrapping timing problems in wireless networks and/or the like.

2. General Background Discussion

Networks and Internet Protocol:

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software. TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks:

Wireless networks can incorporate a variety of types of mobile devices, such as, e.g., cellular and wireless telephones, PCs (personal computers), laptop computers, wearable computers cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device, a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Media-Independent Pre-Authentication:

Media-independent Pre-Authentication (MPA) includes, e.g., a mobile-assisted, secure handover optimization scheme that works over any link-layer and with any mobility management protocol. With MPA, a mobile node is not only able to securely obtain an IP address and other configuration parameters for a Candidate Target Network (CTN) but is also able to send and receive IP packets using the obtained IP address before it actually attaches to the CTN. This makes it possible for the mobile node to complete the binding update of any mobility management protocol and use the new Care of Address (CoA) before performing a handover at link-layer.

MPA preferably works over any link-layer and with any mobility management protocol including Mobile IPv4, Mobile IPv6, MOBIKE, HIP, SIP mobility, etc. In MPA, the notion of IEEE 802.11i pre-authentication is extended to work at a higher layer, incorporating additional mechanisms to perform early acquisition of IP address from a network from which the mobile terminal may move, as well as proactive handover to the network while the mobile terminal is still attached to the current network.

In some circumstances, a Mobile Node (MN) supporting MPA starts a pre-authentication process with an Authentication Agent (AA). A successful authentication enables the PANA authentication agent (PAA) to establish security associations with the AA. This is in addition to a Configuration Agent (CA) used for securely executing a configuration protocol to securely deliver an IP address and other configuration parameters to the mobile nodes, and an Access Router (AR) securely executing a tunnel management protocol to establish a proactive handover tunnel to the mobile node. This entire process is carried out when MN is connected to a current point of attachment. It is explained in detail in "draft-ohba-mobopts-mpa-framework-02.txt", March 2006, and "draft-ohba-mobopts-mpa-framework-03.txt", Oct. 22, 2006, the disclosures of which are incorporated herein by reference.

Providing secure network access service requires access control based on the authentication and authorization of the clients and the access networks. Client-to-network authentication provides parameters that are needed to police the traffic flow through the enforcement points. A protocol is needed to carry authentication methods between the client and the access network.

PANA provides a link-layer agnostic transport for network access authentication methods. The Extensible Authentication Protocol (EAP) [see RFC3748 incorporated herein by reference in its entirety] provides such authentication methods. In this regard, PANA carries EAP which can carry various authentication methods. By the virtue of enabling transport of EAP above IP, any authentication method that can be carried as an EAP method is made available to PANA and hence to any link-layer technology.

The PANA protocol [I-D.ietf-pana-pana] carries EAP messages between a PaC (PANA Client) and a PAA (PANA Authentication Agent) in the access network. If the PaC is a mobile device and is capable of moving one access network to another while running its applications, it is critical for the PaC to perform a handover seamlessly without degrading the performance of the applications during the handover period. When the handover requires the PaC to establish a PANA session with the PAA in the new access network, the signaling to establish the PANA session should be completed as fast as possible.

The PANA protocol is run between a client (PaC) and a server (PAA) in order to perform authentication and authorization for the network access service. The protocol messaging involves of a series of request and responses, some of which may be initiated by either end. Each message can carry zero or more AVPs within the payload. The main payload of PANA is EAP which performs authentication. PANA helps the PaC and PAA establish an EAP session.

PANA is a UDP-based protocol. It has its own retransmission mechanism to reliably deliver messages. PANA messages are sent between the PaC and PAM as part of a PANA session. A PANA session includes a plurality of distinct phases as set forth below, and as illustrated in FIG. 1:

1. Handshake phase: This is the phase that initiates a new PANA session. The handshake phase can be triggered by both the PaC and the PAA.

2. Authentication and authorization phase: Immediately following the handshake phase is the EAP execution between the PAA and PaC. The EAP payload (which carry an EAP method inside) is what is used for authentication. The PAA conveys the result of authentication and authorization to the PaC at the end of this phase.

3. Access phase: After a successful authentication and authorization the host gains access to the network and can send and receive IP data traffic through the EP(s). At any time during this phase, the PaC and PAA may optionally send PANA ping messages to test liveness of the PANA session on the peer.

4. Re-authentication phase: During the access phase, the PAA must initiate re-authentication before the PANA session lifetime expires. EAP is carried by PANA to perform authentication. This phase may be optionally triggered by both the PaC and the PAA without any respect to the session lifetime. The session moves to this phase from the access phase, and returns back there upon successful re-authentication.

5. Termination phase: The PaC or PAA may choose to discontinue the access service at any time. An explicit disconnect message can be sent by either end. If either the PaC or the PAA disconnects without engaging in termination messaging, it is expected that either the expiration of a finite session lifetime or failed liveness tests would clean up the session at the other end.

PANA uses UDP as its transport layer protocol. The UDP port number is assigned, e.g., by IANA. Here, messages are always unicast.

PANA uses Attribute Value Pairs) as discussed below. Here, the payload of any PANA message includes zero or more AVPs. Brief descriptions are set forth below:

Algorithm AVP: contains a pseudo-random function and an integrity algorithm.

AUTH AVP: contains a Message Authentication Code that integrity protects the PANA message.

Cookie AVP: contains a random value that is generated by the PAA according to [RFC4086] and used for making the handshake phase robust against blind resource consumption DoS attacks.

Device-Id AVP: contains a device identifier (link-layer address or an IP address) of the PaC or an EP.

EAP AVP: contains an EAP PDU.

Failed-AVP: contains an offending AVP that caused a failure.

Key-Id AVP: contains an MSK identifier.

Protection-Capability AVP: contains the type of per-packet protection (link-layer vs. network-layer) when a cryptographic mechanism should be enabled after PANA authentication.

NAP-information AVP, ISP-information AVP: contains the identifier of a NAP and an ISP, respectively.

Nonce AVP: contains a randomly chosen value [RFC4086] that is used in cryptographic key computations.

Notification AVP: contains a displayable message.

Provider-Identifier AVP: contains the identifier of a NAP or an ISP.

PPAC AVP: Post-PANA-Address-Configuration AVP. Used to indicate the available/chosen IP address configuration methods that can be used by the PaC after successful PANA authentication.

Provider-Name AVP: contains a name of a NAP or an ISP.

Result-Code AVP: contains information about the protocol execution results.

Session-Id AVP: contains the PANA session identifier value.

Session-Lifetime AVP: contains the duration of authorized access.

Termination-Cause AVP: contains the reason of session termination.

AVPs are a method of encapsulating information relevant to the PANA message. As for an AVP Header, each AVP of type OctetString is be padded to align on a 32-bit boundary, while other AVP types align naturally. A number of zero-valued bytes are added to the end of the AVP Data field till a word boundary is reached. The length of the padding is not reflected in the AVP Length field [see RFC3588]. The fields in the AVP header are sent in network byte order. A format of an illustrative AVP header is depicted in FIG. 2.

For further background information see Protocol for Carrying Authentication for Network Access (PANA), Internet Draft of the PANA Working Group of the I.E.T.F., document no. draft-ietf-pana-pana-12, dated Aug. 24, 2006, to D. Forsberg, Y. Ohba, et al., the entire disclosure of which is incorporated herein by reference as though recited herein in full.

For additional reference, some background terminology includes:

Mobility Binding:

A binding between a locator and an identifier of a mobile terminal.

Mobility Management Protocol (MMP):

A protocol that operates at network layer or higher to maintain a binding between a locator and an identifier of a mobile terminal.

Binding Update:

A procedure to update a mobility binding.

Media-Independent Pre-Authentication Mobile Node (MN):

A mobile terminal of media-independent pre-authentication (MPA) which is, in preferred embodiments, a mobile-assisted, secure handover optimization scheme that works over any link-layer and with any mobility management protocol. An MPA mobile node is an IP node. In this document, the term "mobile node", or "MN", without a modifier refers to "MPA mobile node." An MPA mobile node usually has a functionality of a mobile node of a mobility management protocol as well.

Candidate Target Network (CTN):

A network to which the mobile may move in the near future.

Target Network (TN):

The network to which the mobile has decided to move. The target network is selected from one or more candidate target network.

Proactive Handover Tunnel (PHT):

A bidirectional IP tunnel that is established between the MPA mobile node and an access router of the candidate target network. In this document, the term "tunnel" without a modifier refers to "proactive handover tunnel."

Point of Attachment (PoA):

A link-layer device (e.g., a switch, an access point or a base station, etc.) that functions as a link-layer attachment point for the MPA mobile node to a network.

Care-of Address (CoA):

An IP address used by a mobility management protocol as a locator of the MPA mobile node.

PANA Client (PaC):

The client side of the protocol that resides in the access device (e.g., laptop, PDA, etc.). It is responsible for providing the credentials in order to prove its identity (authentication) for network access authorization. In some examples, the PaC and the EAP peer are co-located in the same access device.

PANA Authentication Agent (PAA):

The protocol entity in the access network whose responsibility is to verify the credentials provided by a PANA client (PaC) and authorize network access to the device associated with the client and identified by a Device Identifier (DI). In some examples, the PAA and the EAP authenticator (and optionally the LAP server) are co-located in the same node.

Note the authentication and authorization procedure can, according to the EAP model, be also offloaded to the backend AAA infrastructure.

PANA Session:

A PANA session begins with the handshake between the PANA Client (PaC) and the PANA Authentication Agent (PAA), and terminates as a result of an authentication or liveness test failure, a message delivery failure after retransmissions reach maximum values, session lifetime expiration, or an explicit termination message. A fixed session identifier is maintained throughout a session. A session cannot be shared across multiple network interfaces. Only one device identifier of the PaC is allowed to be bound to a PANA session for simplicity.

Session Lifetime:

A duration that is associated with a PANA session. For an established PANA session, the session lifetime is bound to the lifetime of the current authorization given to the PaC. The session lifetime can be updated by a new round of EAP authentication before it expires.

Session Identifier:

This identifier is used to uniquely identify a PANA session on the PAA and PaC. It includes an identifier of the PAA, therefore it cannot be shared across multiple PAAs. It is included in PANA messages to bind the message to a specific PANA session. This bidirectional identifier is allocated by the PAA following the handshake and freed when the session terminates.

PANA Security Association (PANA SA):

A PANA security association is formed between the PaC and the PAA by sharing cryptographic keying material and associated context. The formed duplex security association is used to protect the bidirectional PANA signaling traffic between the PaC and the PAA.

Device Identifier (DI):

The identifier used by the network as a handle to control and police the network access of a device. Depending on the access technology this identifier may contain an address that is carried in protocol headers (e.g., IP or link-layer address), or a locally significant identifier that is made available by the local protocol stack (e.g. circuit id, PPP interface id) of a connected device.

Enforcement Point (EP):

A node (such as, e.g., an access point AP or an access router AR) on the access network where per-packet enforcement policies (e.g., filters) are applied on the inbound and outbound traffic of access devices. Information such as the DI and (optionally) cryptographic keys are provided by the PAA per client for generating filters on the EP. The EP and PAA may be co-located.

Pre-Shared Key (PSK):

The IEEE 802.11i protocol specifies that a preshared key can be owned by supplicant and authenticator and used as PMK.

Pairwise Master Key (PMK):

A key used as root key in IEEE 802.11i. It can be obtained after EAP authentication or it acquires PSK's value.

Network Access Provider (NAP):

A service provider that provides, e.g., physical and link-layer connectivity to an access network it manages.

Internet Service Provider (ISP):

A service provider that provides e.g., access to the Internet and other related services.

Master Session Key (MSK):

A key derived by the EAP peer and EAP server and transported to the authenticator [see RFC3748].

Additional terminology and background is incorporated herein by reference from the PANA framework document [I-D.ietf-pana-framework]. In addition, the entire contents of the following documents are also incorporated herein by reference in their entireties as background D. Forsberg, et al., "Protocol for Carrying Authentication for Network Access (PANA)," draft-ietf-pana-pana, work in progress, June 2003; and M. Parthasarathy, "PANA enabling IPsec based Access Control," draft-ietf-pana-ipsec, work in progress, October 2003.

In addition, the entire disclosure of the following I.E.T.F. document is incorporated herein by reference: R. M. Lopez and Y. Ohba, PANA bootstrapping IEEE 802.11 security, draft-marin-pana-ieee80211doti-00, dated Feb. 24, 2006. This document focuses on how PANA can bootstrap link layer security through I.E.E.E. 802.11i and exposes issues which can be raised as a consequence of this interaction. As described above, PANA (Protocol for carrying Authentication for Network Access) is a link-layer agnostic transport for Extensible Authentication Protocol (EAP) to enable network access authentication between clients and access networks. PANA framework defines two types of security associations which can be bootstrapped as a consequence of PANA execution: IP layer security is established with IPsec by using IKE and link-layer security with WPA/IEEE 802.11i in PSK mode. With respect to authentication, two authentication mechanisms are possible in 802.11i: either 802.1X or pre-shared key (also named PSK mode). In PSK mode, the pre-shared key is directly used as a PMK for the 4-way handshake. The mobile node or station (STA) and the Access Point (AP) must be provided with this key. With 802.1X/EAP, the AP acts as an EAP authenticator. EAP server can be co-located in the AP or in a AAA server. In the second case a AAA protocol such as RADIUS [RFC2865] is used between AP and AAA server. The non-AP STA and the AP uses the uncontrolled port for 802.1X. At the end of the 802.1X protocol the non-AP STA and the AP share a key called PMK (Pairwise Master Key).

While a variety of systems and methods are known, there remains a need for improved systems and methods, including, e.g., systems and methods for improving the ability to gain network access.

SUMMARY

The present invention overcomes various limitations and deficiencies in the background art.

According to some embodiments, a method for avoiding loss of data or consumption of resources between a mobile node and an new access network in which an authentication agent performs authentication with an authentication client of the mobile node to effect access to an enforcement point of said access network, said method comprising informing an authentication client of said mobile node that an authentication agent has completed an installation process with the enforcement point.

According to some examples, the method further includes that the installation process includes the installation of authorization parameters. According to some examples the method further includes that the installation of authorization parameters includes installation of ciphering keys for the authentication client to an enforcement point. According to some examples, the method further includes that the authentication client is a PANA authentication client (PaC) and the authentication agent is a PANA authentication agent (PAA). According to some examples, the method further includes that employing a new message exchange between the authentication agent and the authentication client informing the client that the authentication agent has successfully completed an authorization and/or configuration process. According to some examples, the method further includes a message sent by the authentication agent to the authentication client to inform the authentication client that an authorization was correctly carried out. According to some examples, the method further includes that the messages are authenticated if a PANA Security Association was established. According to some examples, the method further includes that the authentication agent and the authentication client engage in such message exchanges only if the authentication agent requires it.

According to some examples, the method further includes that the authentication agent is a PANA authentication agent (PAA) and the PAA signals if it requires such message exchange when it sends a PANA-Bind-Request (PBR) message. According to some examples, the method further includes that the authentication agent is a PANA authentication agent (PaC) and the PaC will wait for a PCR or a PUR if the PBR message signals this to the PaC. According to some examples, the method further includes that the PAA signals if it requires such a message exchange in a Result-Code AVP in the PBR message. According to some examples, the method further includes that the PAA signals if it requires such a message exchange using a new flag defined in the AVP Flags. According to some examples, the method further includes that the PAA signals if it requires such a message exchange using a new AVP included in the PBR message.

The above and/or other aspects features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitations in the accompanying figures, in which:

FIG. 1 is a diagram showing an illustration of PANA messages in a session;

FIG. 2 is a diagram showing an AVP header format;

FIG. 3 is an illustrative message sequence diagram between a PaC, a PAA and an EP demonstrating, e.g., process steps related to, inter alia, illustrative Example Problem with PANA over an Ethernet;

FIG. 5(A) is an illustrative diagram related to a PANA-Conf-Request according to some illustrative embodiments;

FIG. 5(B) is an illustrative diagram related to a PANA-Conf-Answer according to some illustrative embodiments;

FIG. 6(A) is an illustrative diagram related to a PANA-Bind-Request according to some illustrative embodiments;

FIG. 6(B) is an illustrative diagram related to a PANA-Bind-Request according to some illustrative embodiments.

DETAILED DESCRIPTION OF THE PREFERRED EMBODIMENTS

Figure 4:
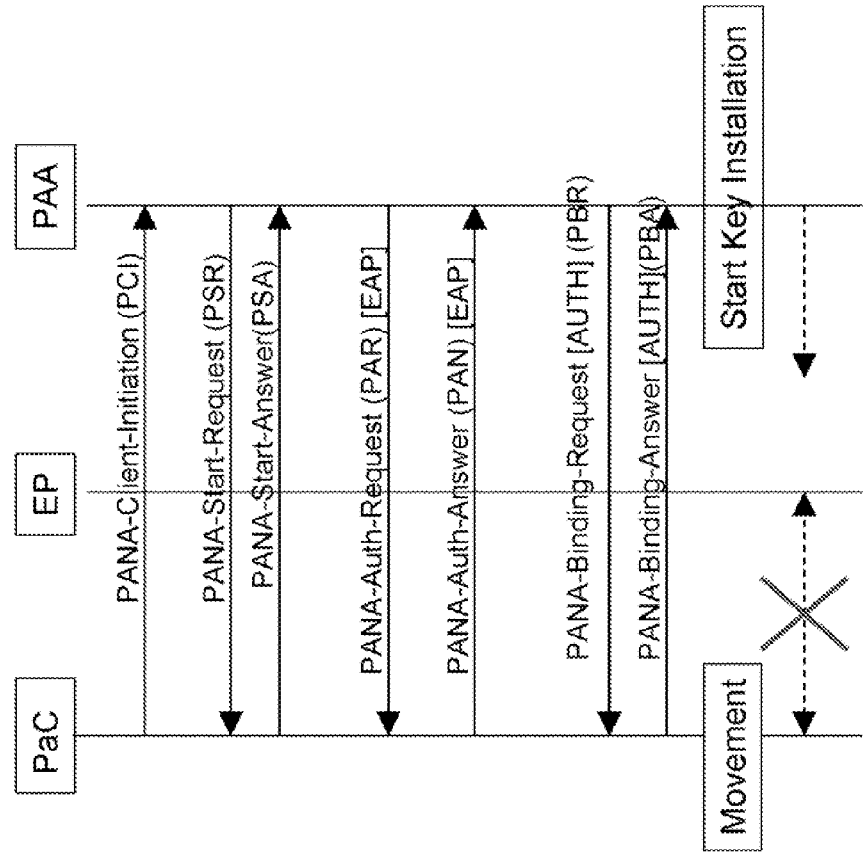
FIG. 4 is an illustrative message sequence diagram between a PaC, a PAA and an EP demonstrating, e.g., process steps related to, inter alia, illustrative Example Problem with PANA over 802.11i.

While the present invention may be embodied in many different forms a number of illustrative embodiments are described with the understanding that the present disclosure is to be considered as providing examples of the principles of the various inventions described herein and that such examples are not intended to limit the invention to preferred embodiments described herein and/or illustrated herein.

Identification of Existing Problems

In existing methods and systems, there are some cases in PANA in which a notification of authentication and authorization result from the PAA (PANA-Authentication-Agent) to the PaC (PANA-Client) is made before the PAA completes installation of authorization parameters such as, e.g., ciphering keys for the PaC to the EPs (Enforcement Points).

As a result, it is possible that a PaC that has received a notification of the authentication and authorization result is not able to gain the network access desired.

For example, consider the following circumstances. A PAA and a PaC are in different subnets and a link-layer address is used as the device identifier of the PaC. In this case, the PAM does not know the device identifier of the PaC until it receives a PBA (PANA-Bind-Answer) message from the PaC. In addition, authorization parameters are not installed to the EPs before the PAA receives the PBA message. However, the PaC may start sending data packets immediately after sending the PBA message. Accordingly, data packets can be lost until the PAA receives the PBA. Moreover, the "blackout" period (e.g., the period in which data packets are lost) becomes substantially longer when the PBA is lost. Furthermore, the situation can be even worse if the PaC is a wireless device (see, e.g., Example 2 below).

Example Problem #1

For illustrative purposes, one exemplary problem can be seen in the context of PANA over an Ethernet. In such cases, the PAA knows the PaC's MAC address after receiving PBA. Moreover, the PaC starts sending data packets after sending the PBA. In addition, after receiving the PBA, the PAA starts installation of authorization parameters to the Ethernet switch (i.e., which is an illustrative EP), but it gets lost.

In this illustrative example, the EP discards data packets until the PBA is received after retransmission of the PER.

For illustrative purposes, FIG. 3 is an illustrative message sequence diagram between a PaC, a PAA and an EP demonstrating, e.g., process steps related to, inter alia, illustrative Example Problem #1.

Example Problem #2

For further illustrative purposes, another exemplary problem can be seen in the context of bootstrapping IEEE 802.11i PSK (Pre-Shared Key) mode. In this example, the PAA knows the PaC's MAC address after receiving the PBA. Moreover, the PaC moves to the AP (Access Point) after sending the PBA.

After the PBA, the PAA starts the PSK installation in the AP, but it arrives late. As a result, in this illustrative example, the AP disassociates the PaC because the PSK has not been installed yet.

For illustrative purposes, FIG. 4 is an illustrative message sequence diagram between a PaC, a PAA and an IP demonstrating, ergo, process steps related to, inter alia, this illustrative Example Problem #2.

The Preferred Embodiments

According to some of the preferred embodiments, systems and methods are employed in which the PaC is able to know when the PAA completes installation of authorization parameters such as, e.g., ciphering keys for the PaC to the EPs. Among other things, the preferred embodiments can improve upon existing systems and methods and can overcome existing problems therein.

In order to solve the problems in the existing systems and methods, it is desired for the PaC to know by some means when the PAA has successfully accomplished the authorization/configuration phase. Because PANA does not provide for such a confirmation, according to the preferred embodiments herein, we define new exchanges of messages (e.g., two messages) for this purpose.

In this regard, two alternative examples are presented below.

Alternative 1: Two New Messages

In a first example, the following two new messages are employed: 1) PANA-Conf-Request (PCR) and 2) PANA-Conf-Answer (PCA).

In this regard, the PANA-Conf-Request (PCP) message is preferably sent by the PAA to the PaC in response to a PANA-Bind-Answer message. This message is preferably optional and sent to inform the PaC if the authorization was correctly carried out. See, e.g., the illustrative example shown in FIG. 5(A).

In addition, the PANA-Conf-Answer (PCA) message is preferably sent by the PaC to the PAA to answer the PCR message. See, e.g., the illustrative example shown in FIG. 5(B).

Preferably, these messages are authenticated if the PANA SA was established.

Alternative 2: PUR/PUA Exchange

In a second example, the following exchange is employed; a PANA-Update-Request (PUR)/PANA-Update-Answer (PUA) message exchange.

In this regard, the PAA preferably sends a PANA-Update-Request (PUR) to inform the PaC if the authorization was correctly carried out. In response, the PaC sends a PANA-Update-Answer to confirm that it received the PUR.

In the preferred embodiments, the PaC and the PAA engage Alternative 1 (PCR/PCA) or Alternative 2 (PUP/PUA) exchange only if the PAA requires it. Preferably, this is signalled by the PAA when it sends the PBR message. In this regard, a number of approaches can be employed to carry this out. Three illustrative approaches (see Approaches 1-3) are set forth in further detail below that depict some preferred embodiments.

In the above-noted examples, the PAA preferably sends the PCR and/or PUR only after receiving the PBA. In this regard, the PaC answers with the respective PCA and/or PUA to acknowledge the PCR and/or the PUR.

In the preferred embodiments, the PaC will only wait for the PCR and/or the PUR as long as the PANA-Bind-Request signals this to the PaC.

Approach 1: New Result Code

According to a first illustrative approach for, e.g., the PAM to signal if it requires Alternative 1 (PCR/PCA) or Alternative 2 (PUR/PUA) Exchange, a new value can be included in Result-Code AVP in the PBR message—e.g., PANA_SUCCESS_CONF.

According to some preferred embodiments, if this value is in Result-Code AVP, the PaC will wait for receiving either PCR or PUR.

In summary, the semantic of this value can be that authentication was successful, but that authorization must be still carried out.

Approach 2: New Flag

According to a second illustrative approach for, e.g., the PAA to signal if it requires Alternative 1 (PCR/PCA) or Alternative 2 (PUR/PUA) Exchange, a new flag is defined in the AVP Flags. By way of example, this new flag can be defined as demonstrated below.

```
 0                   1
 0 1 2 3 4 5 6 7 8 9 0 1 2 3 4 5
+-+-+-+-+-+-+-+-+-+-+-+-+-+-+-+-+
|V M C r r r r r r r r r r r r r|
+-+-+-+-+-+-+-+-+-+-+-+-+-+-+-+-+
```

Here, a new flag can be defined related to C(onfiguration). Preferably, this flag is set by the PAA before sending a PBR if a configuration process is going to be carried out after receiving the PBA. Preferably, the flag signals the PaC to wait for either the PCR or the PUR. By way of illustration, some examples can be similar to that shown in FIG. 6(A).

Approach 3: New AVP

According to a second illustrative approach for, e.g., the PAA to signal if it requires Alternative 1 (PCR/PCA) or Alternative 2 (PUR/PUA) exchange, a new AVP is included in the PBR message—e.g., Delayed-Authz AVP (code 20). In some embodiments, no data content is included (e.g., AVP length=0). By way of illustration, some examples can be similar to that shown in FIG. 6(B).

Example with C-Flag of Final Signalling

Figure 7:
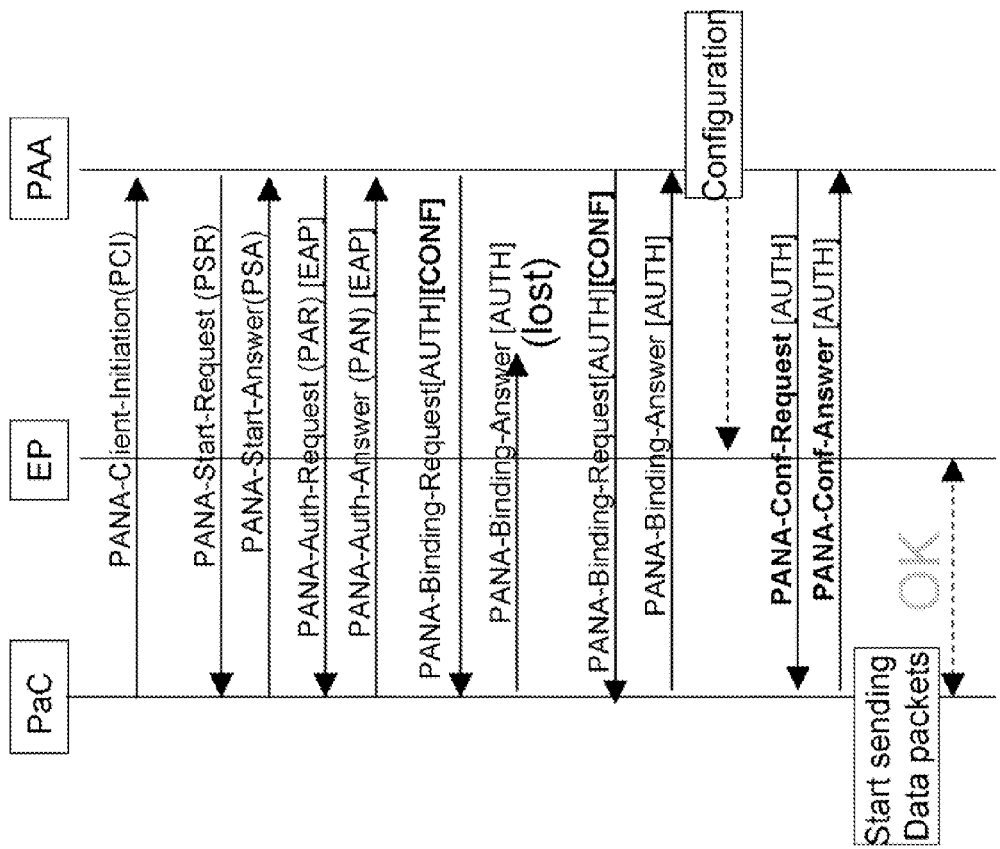
FIG. 7 is an illustrative message sequence diagram between a PaC, a PAA and an EP demonstrating e.g., process steps related to, inter alia, an illustrative example with a C-flag of final signaling.

In this regard, FIG. 7 shows an illustrative message sequence diagram related to a PaC, a PAA and an IP demonstrating, e.g., process steps related to, inter alia, this illustrative example with a C-flag of final signaling.

Other Examples and Further Usage

In some other embodiments, aspects described herein can be employed in other contexts. In some instances, by way of example, an operator may desire to avoid consumption of resources and go through an installation of authorization parameters before verifying that everything is correct.

Accordingly, in some cases, the PAA can require the finishing of the PBR/PBA exchange before starting, e.g., an installation process.

Various embodiments can, thus, be applied in these further cases and/or in other cases as would be appreciated by those in the art based on this disclosure.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is nonexclusive and means "preferably, but not limited to." In this disclosure and during the prosecution of this application, means-plus-function or step-plus-function limitations will only be employed where for a specific claim limitation all of the following conditions are present in that limitations a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for avoiding loss of data or consumption of resources between a mobile node and an new access network in which an authentication agent performs authentication with an authentication client of the mobile node to effect access to an enforcement point of said access network, said method comprising:

an authentication client of a mobile node receiving a notification from an authentication agent that the authentication agent has completed an installation process with the enforcement point, wherein said installation process includes the installation of authorization parameters, and wherein said installation of authorization parameters includes installation of ciphering keys for the authentication client to an enforcement point;

said authentication client of the mobile node waiting before sending packets to the enforcement point until receiving said notification from the authentication agent of the completion of said installation process to avoid pre-mature transmission of packets to the enforcement point prior to receiving said notification from the authentication agent of the completion of said installation process;

wherein said step of said authentication client receiving a notification from an authentication agent that the authentication agent has completed an installation process with the enforcement point is performed within a new message exchange independent of a notification of authentication received from the authentication agent by the authentication client such that in the event that a notification of authentication is received prior to completion of installation, the authentication client will be aware of the status;

further including said authentication client receiving from the authentication agent a request message including an indication that the authentication agent requires said new message exchange with the authentication client to confirm completion of said installation phase including the installation of the authorization parameters for the authentication client to the enforcement point; and said authentication client sending an acknowledgement in an answer message to the authentication agent and waiting for said notification confirming the completion of said installation phase including the installation of the authorization parameters for the authentication client to the enforcement point.

2. A method for avoiding loss of data or consumption of resources between a mobile node and an new access network in which an authentication agent performs authentication with an authentication client of the mobile node to effect access to an enforcement point of said access network, said method comprising:

an authentication client of a mobile node receiving a notification from an authentication agent that the authentication agent has completed an installation process with the enforcement point, wherein said installation process includes the installation of authorization parameters;

providing the authentication client in a different subnet than the authentication agent; and said authentication client of the mobile node waiting before sending packets to the enforcement point until receiving said notification from the authentication agent of the completion of said installation process to avoid pre-mature transmission of packets to the enforcement point prior to receiving said notification from the authentication agent of the completion of said installation process;

wherein said step of said authentication client receiving a notification from an authentication agent that the authentication agent has completed an installation process with the enforcement point is performed within a new message exchange independent of a notification of authentication received from the authentication agent by the authentication client such that in the event that a notification of authentication is received prior to completion of installation, the authentication client will be aware of the status;

further including said authentication client receiving from the authentication agent a request message including an indication that the authentication agent requires said new message exchange with the authentication client to confirm completion of said installation phase including the installation of the authorization parameters for the authentication client to the enforcement point; and said authentication client sending an acknowledgement in an answer message to the authentication agent and waiting for said notification confirming the completion of said installation phase including the installation of the authorization parameters for the authentication client to the enforcement point.

3. The method of claim 2, including using a link-layer address as a device identifier of the authentication client and having the authentication agent not know a device identifier of the authentication client until it receives a certain message from the authentication client.

4. The method of claim 1, further including providing said authentication client as a PANA authentication client (PaC) and said authentication agent as a PANA authentication agent (PAA).

5. The method of claim 4, further including implementing said method in the context of PANA over an Ethernet.

6. The method of claim 4, further including implementing said method in the context of bootstrapping IEEE 802.11i.

7. A method for avoiding loss of data or consumption of resources between a mobile node and an new access network in which an authentication agent performs authentication with an authentication client of the mobile node to effect access to an enforcement point of said access network, said method comprising:

- an authentication client of a mobile node receiving a notification from an authentication agent that the authentication agent has completed an installation process with the enforcement point, wherein said installation process includes the installation of authorization parameters at the enforcement point for the authentication client;
- said authentication client performing a new message exchange with the authentication agent including the authentication client receiving a notification from the authentication agent that the authentication agent has successfully completed an authorization and/or configuration process;
- said authentication client of the mobile node waiting before sending packets to the enforcement point until receiving said notification from the authentication agent of the completion of said authorization and/or configuration process to avoid pre-mature transmission of packets to the enforcement point prior to receiving said notification from the authentication agent of the completion of said authorization and/or configuration process;
- wherein the authentication client is a PANA authentication client (PaC) and the authentication agent is a PANA authentication agent (PAA);
- wherein said PaC receives a signal from the PAA that the PAA requires said new message exchange within a PANA-Bind-Request (PBR) message received from the PAA, and wherein said PaC waits for said notification from the PAA of the completion of said authorization and/or configuration process if the PBR message signals this to the PaC;
- wherein said step of said authentication client receiving a notification from said authentication agent of the completion of said authorization and/or configuration process is performed by providing said new message exchange as independent of a notification of authentication received by the PaC from said PAA such that in the event that a notification of authentication is transmitted prior to completion of installation, said PaC will be aware of the status.

8. The method of claim 7, wherein said message exchange includes a message received from the authentication agent by the authentication client informing the authentication client that an authorization was correctly carried out.

9. The method of claim 7, wherein said new message exchange includes a PANA-Conf-Request (PCR) and a PANA-Conf-Answer (PCA).

10. The method of claim 9, wherein said messages are authenticated if a PANA Security Association was established.

11. The method of claim 7, wherein said new message exchange includes that a PANA-Update-Request (PUR)/PANA-Update-Answer (PUA) message exchange is employed, wherein the authentication agent sends a PUR to inform the authentication client that the authorization was correctly carried out and the authentication client sends a PUA to confirm that it received the PUR.

12. The method of 8, wherein the authentication agent and the authentication client engage in such message exchanges only if the authentication agent requires it.

13. The method of claim 7, wherein the PAA signals if it requires such a message exchange in a Result-Code AVP in the PBR message.

14. The method of claim 7, wherein the PAA signals if it requires such a message exchange using a new flag defined in the AVP Flags.

15. The method of claim 7, wherein the PAA signals if it requires such a message exchange using a new AVP included in the PBR message.

16. The method of claim 1, wherein the authentication client is a PANA authentication client (PaC) and said PaC receives a signal if the authentication agent requires said new message exchange within a PANA-Bind-Request (PBR) message from the authentication agent.

17. The method of claim 16, wherein said PaC receives a signal from the authentication agent indicating if the authentication agent requires said new message exchange including at least one of a new Result-Code, a new flag, or a new AVP within said PBR message.

* * * * *